Figure 1:
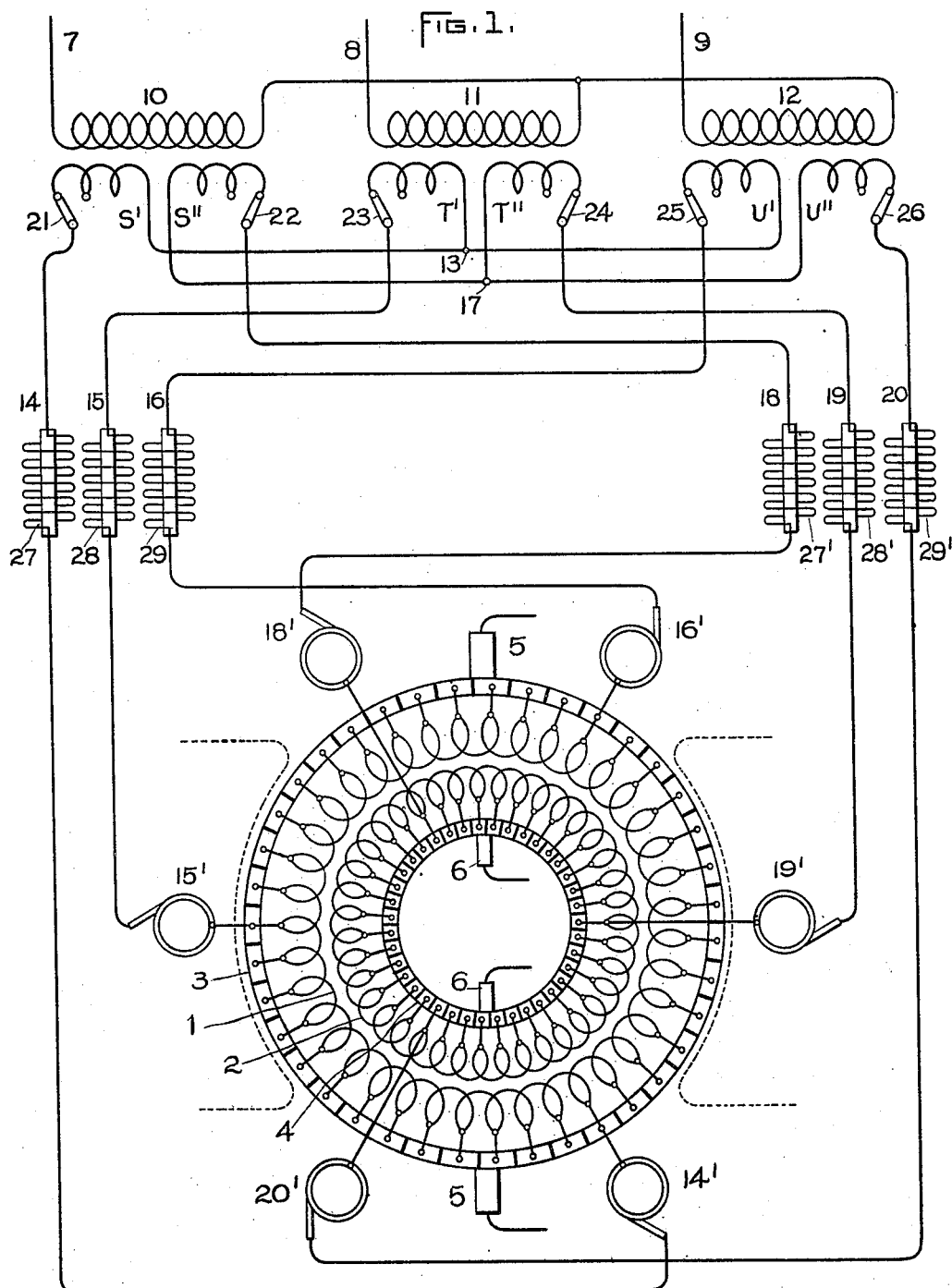

No. 679,008. Patented July 23, 1901.
C. P. STEINMETZ.
SYSTEM OF ELECTRICAL DISTRIBUTION.
(Application filed Dec. 9, 1899. Renewed Aug. 22, 1900.)

(No Model.) 3 Sheets—Sheet 1.

WITNESSES.
Arthur H. Abell.
Alec F. Macdonald.

INVENTOR.
Charles P. Steinmetz,
by Albert G. Davis
Atty.

THE NORRIS PETERS CO., PHOTO-LITHO., WASHINGTON, D. C.

No. 679,008.  
C. P. STEINMETZ.  
SYSTEM OF ELECTRICAL DISTRIBUTION.  
(Application filed Dec. 9, 1899. Renewed Aug. 22, 1900.)

Patented July 23, 1901.

(No Model.)  
3 Sheets—Sheet 3.

Witnesses.  
Fred G. Haring  
Edward Williams Jr.

Inventor.  
Charles P. Steinmetz.  
by Albert G. Davis.  
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 679,008, dated July 23, 1901.

Application filed December 9, 1899. Renewed August 22, 1900. Serial No. 27,731. (No model.)

*To all whom it may concern:*

Be it known that I, CHARLES P. STEINMETZ, a citizen of the United States, residing at Schenectady, in the county of Schenectady, State of New York, have invented certain new and useful Improvements in Systems of Electrical Distribution, (Case No. 991,) of which the following is a specification.

In the design of rotary converters the matter of armature heating is a factor of less importance than the commutator in determining the normal and overload capacity of the converter. This is particularly true where high frequencies are employed, in which case in order to secure a reasonably low speed of rotation the pole-pieces must be increased in number and crowded together, thus correspondingly increasing the number of commutator-segments and the diameter of the commutator, at the same time decreasing the width of the individual segments, and consequently increasing the proportion of insulation between the segments. The resulting high peripheral speed of the commutator, together with the decreased cross-section of commutator-segments and the relative increase of insulating material, seriously decreases the capacity of the commutator for operating smoothly and delivering current without undue heating and sparking. One of the features of my invention consists in obviating this difficulty by dividing the armature-winding into distinct portions, to each of which a suitably-proportioned commutator is connected, the alternating current being supplied to the windings from suitable sources. By this construction the converter is capable of delivering direct current at different voltages, the direct-current terminals of the windings being connected in multiple for one voltage and in series for another voltage.

In order to secure the advantages to be derived from connecting the direct-current ends of the armature-windings either in series or in multiple, I have in general found it necessary to supply each of the windings from separate sources of alternating current—as, for instance, from independent transformer secondaries supplied from a common primary circuit. This construction is rendered necessary by the fact that when the direct-current terminals of the armature-windings of the converter are in multiple the alternating-current terminals of the windings must, if supplied from the same source, be likewise connected in multiple in order to prevent short circuits, while, for the same reason, when the direct-current ends of the windings are connected in series and feeding, for example, a three-wire system the alternating-current ends of the windings must be similarly connected if fed from the same source. Where, on the contrary, the sources of supply for the windings of the converter are separate, no change of connection therewith is necessary when the direct-current ends of the windings are changed from series to multiple or the reverse, thus securing an important advantage.

Another important advantage is attendant upon the use of a plurality of armature-windings. If suitable connections be made to the armature-windings, the resultant armature reaction may be made to correspond to that due to a multiphase current of a greater number of phases than either of the currents supplied to the converter. Thus, for instance, if one of the armature-windings of the converter be supplied with a three-phase current through suitable connections, while another winding is supplied from a source of the same phase, but with each of the terminals reversed and connected to points intermediate the connections of the alternating leads of the first winding, a six-phase armature reaction will result. Although in all multiphase converters, whatever be the number of phases, the armature reaction due to the energy component of the alternating current exactly balances the armature reaction due to the direct current, neglecting losses in the machine, it is nevertheless a distinct advantage to have the armature reaction correspond to as large a number of phase-displaced currents as possible, since in this case the local variations of magnetomotive force about the armature are correspondingly decreased, thus decreasing the resultant loss from eddy-currents and eliminating the disturbing effects of the high-frequency components of armature reaction.

In addition to the advantages briefly mentioned above my invention comprises other distinct and valuable improvements, as will hereinafter be described in connection with the accompanying drawings and pointed out in the claims appended hereto, to which reference is to be made in determining the scope of my invention.

Figure 2:
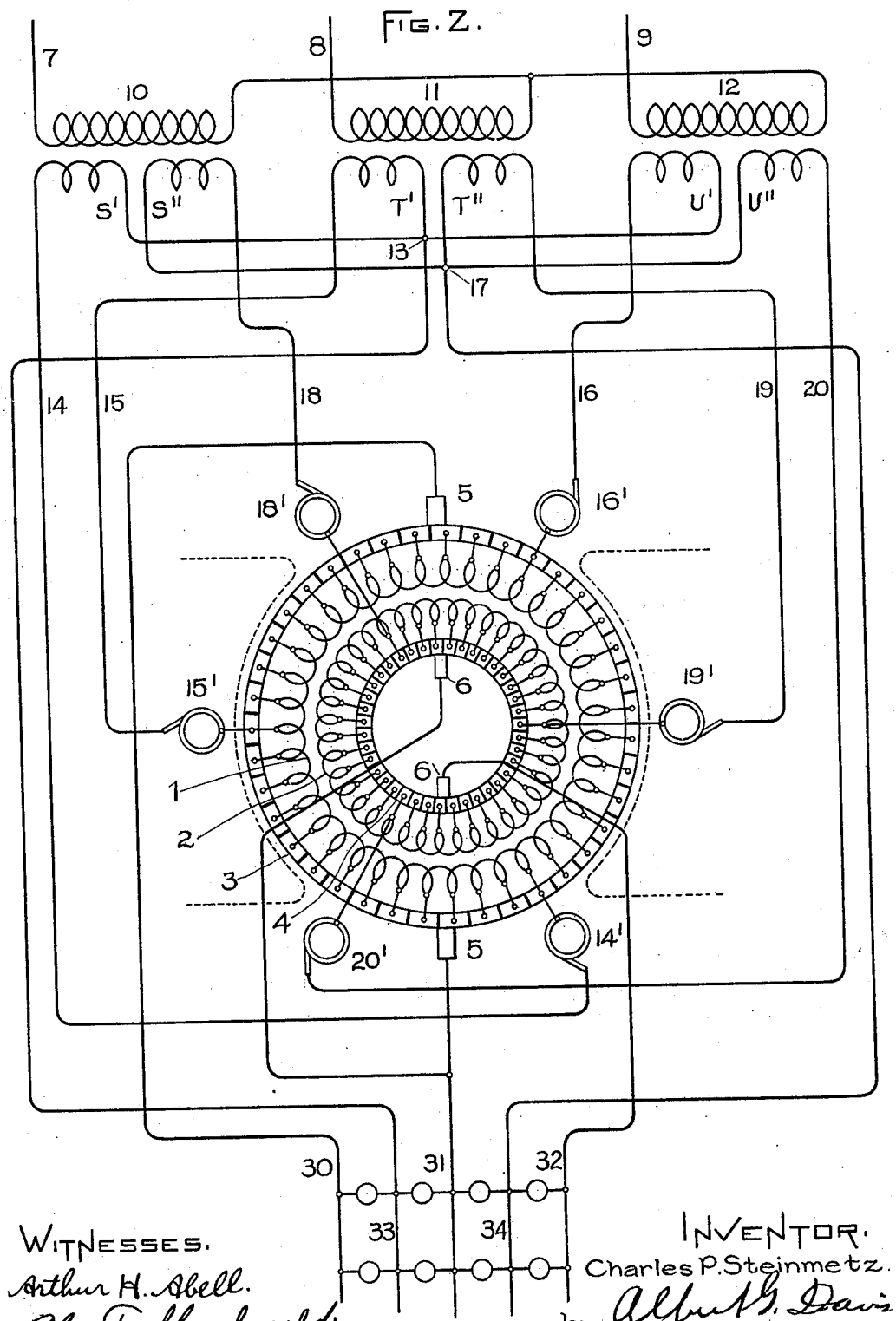
Figure 3:
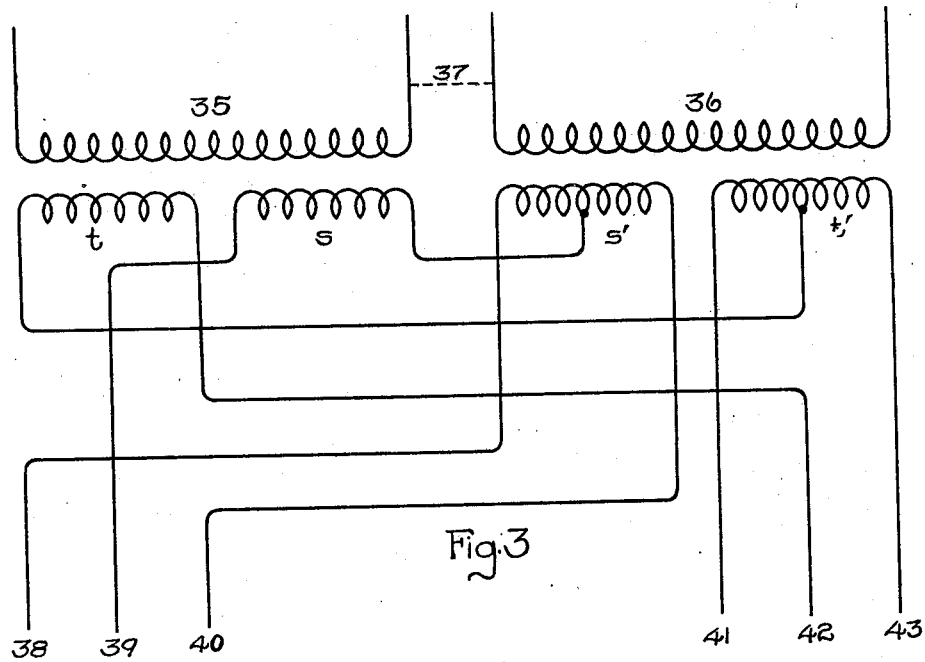
Figure 4:
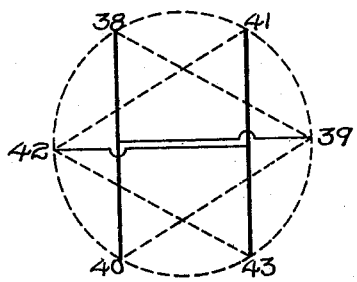

In the drawings, Figure 1 represents a double-winding rotary converter fed from independent secondary windings. Fig. 2 shows a similar converter operating in connection with a five-wire direct-current distribution system. Fig. 3 shows a modified form of connections for the transformer secondaries connected to the converter, and Fig. 4 is an explanatory diagram.

Before proceeding to a detailed description of the various features which comprise my invention I wish it to be understood that the systems hereinafter described are reversible and capable of transforming alternating current to direct current or the reverse, as may be found desirable. Wherever, therefore, for convenience I describe transformer-windings as either primary or secondary, it is to be understood that this description refers only to one phase of the mode of operation of my invention, since the windings which under one set of conditions operate as secondaries may under a different set of conditions operate as primaries.

In Fig. 1 two interspersed or suitably-superposed rotary-converter armature-windings are indicated diagrammatically at 1 and 2. To these windings suitable commutators 3 4 are respectively connected in the ordinary manner. Upon each commutator bear brushes, as usual. In Fig. 1 the diagram is intended to represent the connections corresponding to a bipolar field, and one set of brushes only is consequently employed for each commutator, the sets of brushes being represented at 5 6. These brushes may be connected either in multiple or in series, as desired, and if connected in series may be used to feed a three-wire system. The connection last mentioned is included in the diagrammatic representation shown in Fig. 2, to which reference will hereinafter be made.

In Fig. 1 I have shown a three-phase circuit represented by mains 7 8 9 for supplying energy to both windings of the converter, the connection between the three-phase mains and the converter-windings being made inductively. The three-phase mains are connected to three transformer-windings 10, 11, and 12, each of which is provided with a plurality of independent secondaries, in this case shown as two in number. A three-phase source of supply is formed by connecting together in a suitable manner one secondary winding of each of the transformers. These windings may be connected either in delta or gamma, as may be desired, although in the drawings I have shown the windings as connected in gamma. Corresponding terminals of the secondaries S' T' U' are connected to a common point 13, while the remaining terminals are connected to leads 14 15 16, constituting a three-phase source of supply. As shown in the drawings, the leads 14 15 16 are connected through collector-rings 14' 15' 16' to symmetrically-displaced points in the armature-winding 1. In a similar manner the independent secondaries S'', T'', and U'' are Y or gamma connected to a common point 17, but with the terminals of each secondary reversed with respect to the connections of the first set of secondaries. A second three-phase system of conductors 18, 19, and 20 leads from the free terminals of the secondaries S'', T'', and U'' and is connected through suitable collector-rings 18' 19' 20' to symmetrically-displaced points upon the second winding 2 of the rotary converter, the connections, however, being made in such a manner as to cause the connections of one winding to be reversed or angularly displaced with respect to the connections of the other winding, thereby producing, in the present instance, a six-phase relation of the resultant magnetomotive forces. The relation of the magnetomotive forces may be represented by first drawing three equiangularly-displaced radii to represent the magnetomotive forces due to one set of secondaries and then revolving each radius through one hundred and eighty degrees in order to represent the magnetomotive forces due to the other set of secondaries. Six equiangularly-displaced radii are the result.

In order to vary the electromotive forces at the direct-current terminals of the converter, I may, if desired, arrange the transformers so that their ratios of conversion may be varied. For this purpose each of the secondaries is provided with suitable switching mechanism for varying the number of effective turns. Diagrammatically these switches are indicated at 21 to 26, inclusive.

If desired, automatic control of voltage regulation may be secured by inserting inductances in the alternating supply-mains, as shown, for instance, at 27 to 29 and 27' to 29', the converter being provided in this instance with direct-current series windings in a manner well understood. To avoid complication, the field-windings of the converter have not been shown in any instance. The pole-pieces, however, are indicated by dotted lines.

Fig. 2 represents substantially what is indicated in Fig. 1, but with the addition of certain connections which enable a five-wire system of direct-current distribution to be supplied from the direct-current ends of the converter. The brushes 5 5 of one of the converter-windings and the brushes 6 6 of the other winding are connected to mains 30, 31, and 32, two brushes 5 6, of opposite polarity, being connected together to the main 31, which becomes a neutral conductor with respect to the mains 30 and 32. The connections so far are substantially the same as between two machines operating on the Edison three-wire system. The point 13 in the gamma connection of the transformer-secondaries, corresponding to one of the converter-windings, is of neutral potential with respect to the direct-current voltage derived from said winding and impressed on the mains 30 31. A conductor 33 is consequently led from the neutral point 13 and coöperates with the mains 30 31 as a neutral conductor, thus forming a three-wire subsystem. In a similar manner a main 34 is connected to the neutral point 17 of the system of transformer secondaries used to supply the second converter-winding 2 and coöperates with the mains 31 32, connected to the direct-current brushes of said winding 2, thereby forming another three-wire subsystem. Taken together the mains 30 to 34, inclusive, constitute a five-wire distribution system, thus enabling a considerable number of different voltages to be obtained from a single rotary converter.

Fig. 3 illustrates diagrammatically a means for deriving resultant three-phase electromotive forces from two-phase currents, one set of electromotive forces being impressed upon a converter armature-winding (not here shown, but illustrated in previous figures of the drawings,) and the other set of electromotive forces upon the other converter-winding. At 35 and 36 are shown two transformer primary windings connected to a two-phase supply system which may be either interconnected or otherwise, as is desired. The dotted line 37 is intended to represent a connection between two of the two-phase supply-mains for the purpose of tying them together and constituting them a common return. Each of the primaries 35 and 36 is provided with two independent secondaries. One terminal of the secondary $s$ is connected to the middle point of the secondary $s'$ of different phase, the remaining terminal of the secondary $s$ and the free terminals of the secondary $s'$ being connected to three-phase leads 38, 39, and 40. The electromotive forces of the two windings are properly proportioned in a well-known manner, so as to secure equal resultant electromotive forces between each pair of mains 38, 39, and 40, referred to. The secondaries $t$ and $t'$ are similarly connected to three-phase mains 41, 42, and 43, except that the secondary $t$ is reversed, as shown, in order to secure a six-phase relation of electromotive forces. The relation of electromotive forces upon the mains 38 to 43, inclusive, is indicated in Fig. 4, in which corresponding figures represent corresponding mains.

Although I have described my invention in detail, I do not wish to be limited to the particular constructions shown, since my invention embraces various broad features of novelty, as pointed out in the following claims.

What I claim as new, and desire to secure by Letters Patent of the United States, is—

1. The combination of a dynamo-electric machine, a plurality of separate windings on said machine, and separate multiphase circuits connected respectively to said windings and inductively to a single multiphase circuit.

2. The combination of a dynamo-electric machine having two separate windings, three-phase leads connected to one of said windings and inductively connected to a multiphase circuit, and a separate set of three-phase leads connected to the other winding and inductively connected to said multiphase circuit.

3. The combination of a multiphase circuit, inductively connected to two, separate, relatively phase-displaced, three-phase circuits, and a dynamo-electric machine having two separate windings connected respectively to said three-phase circuits.

4. The combination of a plurality of separate sources of multiphase current, a dynamo-electric machine having a plurality of separate windings equal in number to the number of said sources, and connections between said windings and said sources respectively.

5. The combination of a rotary converter having two separate armature-windings, independent sets of multiphase transformer-windings, and separate connections between said transformer-windings and said armature-windings respectively.

6. The combination of primary exciting-circuits of different phase, a plurality of secondary circuits inductively related to each of said primary circuits, and a dynamo-electric machine fed from all of said secondary circuits.

7. The combination of two separate sources of multiphase current and a dynamo-electric machine fed from said source so as to generate magnetomotive forces having a greater number of phases than either of said sources.

8. The combination of separate sources of multiphase current and a dynamo-electric machine fed from said sources so as to generate magnetomotive forces having a greater number of phases than any of said sources.

9. The combination of two separate secondary coils inductively supplied with currents of different phase, two other secondary coils similarly supplied with currents of different phase, and a dynamo-electric machine having two separate windings, one of said windings being connected to one pair of said secondary coils and the other to another pair of said secondary coils.

10. A rotary converter provided with two separate multiphase windings and a single set of field-magnets.

11. A rotary converter provided with two separate three-phase windings and a single set of field-magnets.

12. A rotary converter provided with two separate three-phase windings interrelated so as to generate six-phase magnetomotive forces.

13. A synchronous alternating-current dynamo-electric machine having one of its relatively-revolving members provided with two separate, angularly-displaced, multiphase windings.

14. A rotary converter provided with separate multiphase windings, and a commutator connected to each multiphase winding.

15. A rotary converter provided with two, three-phase, windings, and a commutator connected to each winding.

16. A rotary converter provided with two angularly-displaced, three-phase windings, and a commutator connected to each winding.

17. The combination of a plurality of separate sources of multiphase, alternating current, a rotary converter having a plurality of separate multiphase windings, and connections between said windings and said sources of current.

18. A rotary converter provided with two separate multiphase windings, a single set of field-magnets, a commutator for each winding, brushes on each commutator, and direct-current mains connected to said brushes.

19. A rotary converter provided with two separate multiphase windings, a single set of field-magnets, a commutator for each winding, brushes on each commutator, and connections from said brushes to coöperating direct-current mains.

20. A rotary converter, a plurality of independent sets of multiphase, transformer secondaries, and connections between said secondaries and said rotary converter.

21. The combination of a rotary converter having two armature-windings, two independent sets of multiphase, transformer secondaries, connections between one of said armature-windings and one set of said secondaries, and other connections between the other armature-winding and the other set of secondaries.

22. The combination of a rotary converter having two, angularly-displaced, three-phase, armature-windings, two independent sets of three-phase, transformer secondaries, connections between one of said armature-windings and one of said sets of secondaries, and other connections between the other armature-winding and the other set of secondaries.

23. The combination of a plurality of separate sources of multiphase alternating current and a dynamo-electric machine connected to said sources so as to generate magnetomotive forces having a greater number of phases than any of said sources.

24. The combination of a plurality of separate sources of multiphase alternating current and a dynamo-electric machine connected to said sources so as to generate magnetomotive forces having a number of phases different from that of any of said sources.

25. The combination of a rotary converter having separate, three-phase, armature-windings, independent sets of three-phase transformer-windings, and connections between said transformer-windings and said armature-windings respectively.

26. The combination of two separate sets of multiphase transformer-windings each set being so arranged as to have a point of neutral potential, a rotary converter having two separate armature-windings, and a five-wire, direct-current system formed by conductors leading from said neutral points and the direct-current terminals of said converter.

27. A synchronous alternating-current dynamo-electric machine having one of its relatively-revolving members provided with a plurality of separate, angularly-displaced, multiphase windings.

28. A rotary converter provided with a plurality of separate multiphase windings and a single set of field-magnets.

29. A rotary converter provided with a plurality of multiphase windings and a commutator connected to each of said windings.

30. An alternating-current machine provided with a plurality of armature-windings, means for commutating current flowing in said windings, and alternating-current leads connected to said windings, the points of connection of the leads corresponding to one winding being angularly displaced from the points of connection of the leads corresponding to another winding.

31. An alternating-current dynamo-electric machine having a plurality of windings to each of which a commutator is connected, and leads connected to points in each of said windings, the points of connection of the leads corresponding to one of the windings being angularly displaced from the points of connection of the leads corresponding to another winding.

32. An alternating-current machine provided with a plurality of windings, means for commutating current flowing in said windings, and alternating-current leads connected to said windings, the points of connection of the leads corresponding to one winding being displaced in phase from points of connection of leads corresponding to another winding.

33. An alternating-current dynamo-electric machine having a plurality of windings to each of which a commutator is connected, and leads connected to points in each of said windings, the points of connection of leads corresponding to one of the windings being displaced in phase from points of connection of leads corresponding to another winding.

In witness whereof I have hereunto set my hand this 8th day of December, 1899.

CHARLES P. STEINMETZ.

Witnesses:
BENJAMIN B. HULL,
MABEL E. JACOBSON.